(12) United States Patent
Sutoh et al.

(10) Patent No.: US 10,567,609 B2
(45) Date of Patent: Feb. 18, 2020

(54) ILLUMINATION DEVICE, IMAGE SCANNING APPARATUS, AND IMAGE FORMING APPARATUS

(71) Applicant: SHARP KABUSHIKI KAISHA, Sakai, Osaka (JP)

(72) Inventors: Yasuhiro Sutoh, Sakai (JP); Shohichi Fukutome, Sakai (JP); Kenji Nakanishi, Sakai (JP); Yuuya Iwai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/277,951

(22) Filed: Feb. 15, 2019

(65) Prior Publication Data

US 2019/0191050 A1    Jun. 20, 2019

Related U.S. Application Data

(62) Division of application No. 15/825,393, filed on Nov. 29, 2017, now Pat. No. 10,244,140.

(30) Foreign Application Priority Data

Dec. 1, 2016    (JP) .................................. 2016-233731

(51) Int. Cl.
*H04N 1/04*    (2006.01)
*H04N 1/028*    (2006.01)
*F21V 8/00*    (2006.01)

(52) U.S. Cl.
CPC ......... *H04N 1/0288* (2013.01); *G02B 6/0021* (2013.01); *G02B 6/0038* (2013.01);
(Continued)

(58) Field of Classification Search
CPC ............. H04N 1/0288; H04N 1/02835; H04N 1/0284; G02B 6/0021; G02B 6/0038;
(Continued)

(56) References Cited

U.S. PATENT DOCUMENTS 8,358,450 B2 *  1/2013  Kim ................... H04N 1/02815
                                                358/474
8,619,343 B2 * 12/2013  Kim ................... H04N 1/02815
                                                358/474
(Continued)

FOREIGN PATENT DOCUMENTS

CN      102346274 A     2/2012
CN      105323409 A     2/2016
(Continued)

OTHER PUBLICATIONS

Notice of Allowability dated Nov. 15, 2018 in the parent U.S. Appl. No. 15/825,393.

*Primary Examiner* — Cheukfan Lee
(74) *Attorney, Agent, or Firm* — ScienBiziP, P.C.

(57) ABSTRACT

An illumination device includes a light guide member having a bar-like shape and a light source disposed so as to face an end surface of the light guide member. The illumination device guides light from the light source in the light guide member and emits the light from a light emission surface of the light guide member formed in a longitudinal direction of the light guide member. The light emission surface includes a first light diffusing portion that is formed in a first portion near the light source and that has a protruding/recessed shape, and a second light diffusing portion that is formed in a second portion adjacent to an end of the first light diffusing portion, the end being away from the light source. The second light diffusing portion has a (Continued)

protruding/recessed shape and has lower light diffusivity than the first light diffusing portion.

12 Claims, 9 Drawing Sheets

(52) U.S. Cl.
CPC ......... *G02B 6/0051* (2013.01); *G02B 6/0061* (2013.01); *G02B 6/0096* (2013.01); *H04N 1/0284* (2013.01); *H04N 1/02835* (2013.01); *G02B 6/0053* (2013.01); *G02B 6/0055* (2013.01); *G02B 6/0073* (2013.01)

(58) Field of Classification Search
CPC .. G02B 6/0051; G02B 6/0061; G02B 6/0096; G02B 6/0053; G02B 6/0055; G02B 6/0073
USPC .................................................. 358/484, 475
See application file for complete search history.

(56) References Cited

U.S. PATENT DOCUMENTS

| | | | | |
|---|---|---|---|---|
| 8,698,380 | B2* | 4/2014 | Watanabe | B41J 2/161 252/62.9 PZ |
| 8,814,413 | B2* | 8/2014 | Hsiao | G02B 6/0028 362/608 |
| 8,837,015 | B2* | 9/2014 | Kim | H04N 1/02815 358/474 |
| 9,134,009 | B2* | 9/2015 | Wilsher | F21V 13/02 |
| 9,377,572 | B2* | 6/2016 | Kim | G02B 6/001 |
| 2005/0088707 | A1* | 4/2005 | Sakurai | H04N 1/02815 358/475 |
| 2005/0180159 | A1* | 8/2005 | Wu | H04N 1/02815 362/555 |
| 2005/0276064 | A1* | 12/2005 | Wu | H04N 1/02815 362/555 |
| 2006/0034579 | A1* | 2/2006 | Sugiura | G02B 6/0028 385/146 |
| 2007/0297189 | A1* | 12/2007 | Wu | G02B 6/001 362/555 |
| 2008/0084708 | A1* | 4/2008 | Lee | G02B 6/0028 362/612 |
| 2009/0052205 | A1* | 2/2009 | Chen | G02B 6/001 362/612 |
| 2009/0196017 | A1* | 8/2009 | Wang | G02F 1/133615 362/97.1 |
| 2010/0002461 | A1* | 1/2010 | Wu | G02B 6/001 362/558 |
| 2010/0014317 | A1* | 1/2010 | Liao | G02B 6/0035 362/619 |
| 2010/0033988 | A1* | 2/2010 | Chiu | G02B 6/001 362/619 |
| 2011/0103094 | A1* | 5/2011 | Nagata | G02B 6/0068 362/613 |
| 2011/0176089 | A1* | 7/2011 | Ishikawa | G02B 6/0018 349/65 |
| 2011/0273750 | A1* | 11/2011 | Wilsher | H04N 1/02815 358/475 |
| 2012/0019877 | A1 | 1/2012 | Yamaguchi et al. | |
| 2012/0307319 | A1* | 12/2012 | Higashitani | H04N 1/02825 358/474 |
| 2013/0114979 | A1* | 5/2013 | Kim | H04N 1/02815 399/220 |
| 2013/0222865 | A1* | 8/2013 | Iwamatsu | G02B 6/0051 358/484 |
| 2014/0063568 | A1* | 3/2014 | Wilsher | F21V 13/02 358/475 |
| 2015/0181070 | A1* | 6/2015 | Tanaka | G02B 6/001 358/475 |
| 2015/0234119 | A1* | 8/2015 | Oh | G02B 6/0016 362/551 |
| 2016/0006897 | A1 | 1/2016 | Suto et al. | |
| 2016/0231492 | A1* | 8/2016 | Nakayama | G02B 6/0061 |
| 2016/0301820 | A1 | 10/2016 | Suto et al. | |
| 2018/0372296 | A1* | 12/2018 | Saito | G02B 6/0005 |

FOREIGN PATENT DOCUMENTS

| | | | |
|---|---|---|---|
| JP | 2008-140726 | A | 6/2008 |
| JP | 2008140726 | A * | 6/2008 |
| JP | 2010-118154 | A | 5/2010 |
| JP | 2010118154 | A * | 5/2010 |
| JP | 2013145710 | A * | 7/2013 |

* cited by examiner

ILLUMINATION DEVICE, IMAGE SCANNING APPARATUS, AND IMAGE FORMING APPARATUS

This is a divisional application of U.S. patent application Ser. No. 15/825,393 filed on Nov. 29, 2017, entitled "ILLUMINATION DEVICE, IMAGE SCANNING APPARATUS, AND IMAGE FORMING APPARATUS".

BACKGROUND

1. Field

The present disclosure relates to an illumination device, an image scanning apparatus, and an image forming apparatus.

2. Description of the Related Art

An example of existing illumination devices is disclosed in Japanese Unexamined Patent Application Publication No. 2008-140726 (Patent Document 1). The illumination device of Patent Document 1 includes a bar-shaped light guide member made of a transparent material and a light source disposed so as to face an end surface of the light guide member. One side surface (a part of the circumferential surface) of the light guide member has a fine reflection pattern that is formed along the entire length of the light guide member in the longitudinal direction. The light guide member has a light emission surface that faces the reflection pattern and that is a cylindrical surface for providing directivity to emitted light. A protruding/recessed portion for diffusing light is formed in a part of the light emission surface of the light guide member near the light source. Illuminance distribution, in the transversal direction (circumferential direction) of the light guide member, of light emitted from a part of the light guide member near the light source has a sharp and large peak, compared with light emitted from a part of the light guide member away from the light source. With the technology described in Patent Document 1, by forming the protruding/recessed portion for diffusing light on the part of the light emission surface near the light source, the peak of the illuminance distribution in the transversal direction is removed, and therefore the illuminance can be made uniform along the entire length of the light guide member in the longitudinal direction.

Another example of existing illumination devices is disclosed in Japanese Unexamined Patent Application Publication No. 2010-118154 (Patent Document 2). In the illumination device of Patent Document 2, protruding/recessed lines having ridges extending in the longitudinal direction are formed on the light emission surface of the light guide member along the entire length of the light guide member in the longitudinal direction. Thus, illuminance distribution in the transversal direction can be maintained within a predetermined range along the entire length in the longitudinal direction. It is also disclosed that, in order to suppress variation of illuminance distribution in the transversal direction in accordance with the position in the longitudinal direction, the width, the height, and the number of the protruding/recessed lines are changed in the longitudinal direction.

The technology described in Patent Document 1, in which the protruding/recessed portion for diffusing light is formed in a part near the light source, has a problem in that stripes (image stripes) may be generated in a scanned image at a position corresponding to the boundary between the part in which the protruding/recessed portion for diffusing light is formed and a part in which the protruding/recessed portion for diffusing light is not formed.

With the technology described in Patent Document 2, in which protruding/recessed lines (light diffusing portion) are (is) formed along the entire length of the light emission surface of the light guide member in the longitudinal direction, has a problem in that the total illuminance on an object is reduced.

SUMMARY

Therefore, it is desirable to provide an illumination device, an image scanning apparatus, and an image forming apparatus that are novel.

In particular, it is desirable to provide an illumination device, an image scanning apparatus, and an image forming apparatus that can suppress generation of image stripes without reducing illuminance on an object.

According to an aspect of the present disclosure, an illumination device includes a light guide member that is made of a transparent material and that has a bar-like shape; and a light source that is disposed so as to face at least one end surface of the light guide member. The illumination device guides light from the light source in the light guide member and emits the light from a light emission surface of the light guide member formed in a longitudinal direction of the light guide member. The light emission surface includes a first light diffusing portion that is formed in a first portion of the light emission surface near the light source and that has a protruding/recessed shape and a second light diffusing portion that is formed in a second portion of the light emission surface adjacent to an end of the first light diffusing portion, the end being away from the light source, the second light diffusing portion having a protruding/recessed shape and having lower light diffusivity than the first light diffusing portion.

DESCRIPTION OF THE EMBODIMENTS

First Embodiment

Figure 1:
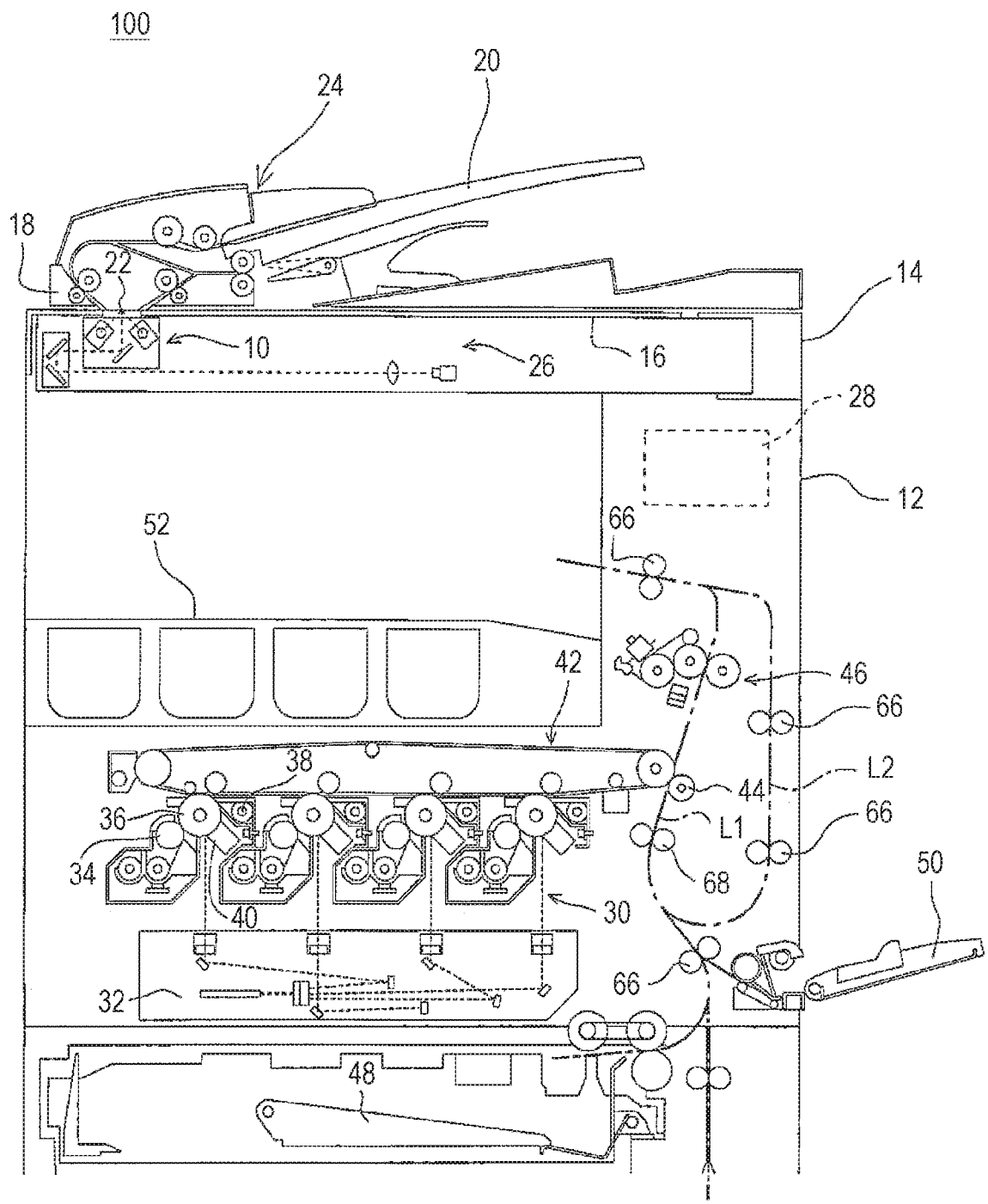
FIG. 1 is a schematic view of an image forming apparatus including an illumination device and an image scanning apparatus according to a first embodiment of the present disclosure.

Referring to FIG. 1, an illumination device 10 according to a first embodiment of the present disclosure is used for an image forming apparatus 100 that forms an image on a sheet by using an electrophotographic method. The illumination device 10 includes two light guide members 80 that are bar-shaped and two pairs of light sources 82 that are disposed so as to face the end surfaces of the light guide members 80. As described below in detail, the illumination device 10 is disposed in an image scanning apparatus 14. Each of the light sources 82 emits light into a corresponding one of the light guide members 80, the light guide member 80 guides the light, and the light is emitted from a light emission surface 114, which is formed in the circumferential surface of the light guide member 80 in the longitudinal direction, toward an image scanning position 22, thereby illuminating a document (object).

First, the basic structure of the image forming apparatus 100 will be schematically described. In the embodiment, the image forming apparatus 100 is a multifunctional peripheral (MFP) having a copier function, a printer function, a scanner function, a facsimile function, and the like.

As illustrated in FIG. 1, the image forming apparatus 100 includes an apparatus body 12 and the image scanning apparatus 14 disposed in an upper part of the apparatus body 12.

The apparatus body 12 accommodates a controller 28, which includes a CPU, a memory, and the like; an image forming section 30; and the like. The controller 28 transmits control signals to various parts of the image forming apparatus 100 in accordance with, for example, input operations performed on an operation unit, such as a touch panel, to cause the image forming apparatus 100 to perform various functions.

The image forming section 30 includes an exposure unit 32, developing units 34, photoconductor drums 36, cleaner units 38, chargers 40, an intermediate transfer belt unit 42, a transfer roller 44, a fixing unit 46, and the like. The image forming section 30 forms an image on a sheet, which is transported from a feed tray 48 or a manual feed tray 50, and discharges the sheet, on which an image has been formed, to a sheet output tray 52. Image data captured by an image scanning unit 26 (described below) or image data transmitted from an external computer is used as image data for forming an image on a sheet.

The image forming apparatus 100 uses image data for color images in four colors, which are black (K), cyan (C), magenta (M), and yellow (Y). Therefore, the image forming apparatus 100 includes four imaging stations, each including the developing unit 34, the photoconductor drum 36, the cleaner unit 38, and the charger 40. The imaging stations form latent images in four colors.

A first sheet transport path L1 is formed in the apparatus body 12. A sheet from the feed tray 48 or from the manual feed tray 50 is transported along the first sheet transport path L1 to the sheet output tray 52 via a registration roller 68, the transfer roller 44, and the fixing unit 46. A second sheet transport path L2 is formed in the apparatus body 12. When forming images on both sides of a sheet, after one of the images has been formed on one side of the sheet and the sheet has passed through the fixing unit 46, the second sheet transport path L2 allows the sheet to return to a position in the first sheet transport path L1 on the upstream side of the transfer roller 44 in the sheet transport direction. A plurality of transport rollers 66, which provide auxiliary propelling forces to the sheet, are appropriately disposed along the first sheet transport path L1 and the second sheet transport path L2.

Figure 2:
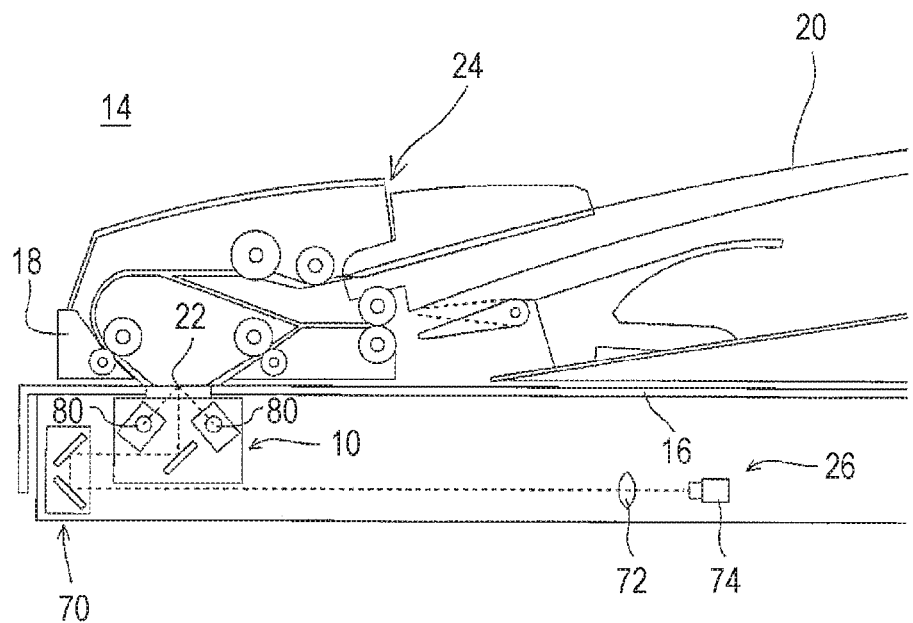
FIG. 2 is a schematic view of the image scanning apparatus of FIG. 1.

Referring to FIGS. 1 and 2, the image scanning apparatus 14 includes a document table 16 made of a transparent material. A document pressing cover 18 is disposed above the document table 16 so as to be openable/closeable via a hinge or the like. An automatic document feeder (ADF) 24 is disposed on the document pressing cover 18. The ADF 24 automatically feeds sheets, which are placed on a document tray 20, one by one to the image scanning position 22. Although not illustrated, an operation unit, which includes a touch panel, operation buttons, and the like, is disposed in front of the document table 16. The operation unit accepts an input operation, such as print instruction, from a user.

The image scanning apparatus 14 includes the illumination device 10, which includes the light guide members 80 and the light sources 82; a mirror unit 70, which includes a plurality of mirrors; and the image scanning unit 26, which includes an imaging lens 72, a line sensor 74, and the like. The image scanning apparatus 14 exposes a document surface to light emitted from the illumination device 10 and guides reflected light from the document surface to the imaging lens 72 via the mirror unit 70 and the like. The imaging lens 72 focuses the reflected light on a light receiving element of the line sensor 74. The line sensor 74 detects the brightness and chromaticity of the reflected light focused on the light receiving element and generates image data based on the image of the document surface. A charge coupled device (CCD), a contact image sensor (CIS), or the like is used as the line sensor.

A position in the image scanning unit 26 facing the image scanning position 22 is the home position. When scanning an image of a document placed on the document tray 20, the image scanning unit 26 scans the image of the document surface while the sheet is transported by the ADF 24 and passes the image scanning position 22, thereby obtaining the image data. When scanning an image of a document placed on the document table 16, the illumination device 10, the mirror unit 70, and the like move below the document table 16 in the sub-scanning direction, and the image scanning unit 26 scans the image of the document surface, thereby obtaining the image data.

Figure 3:
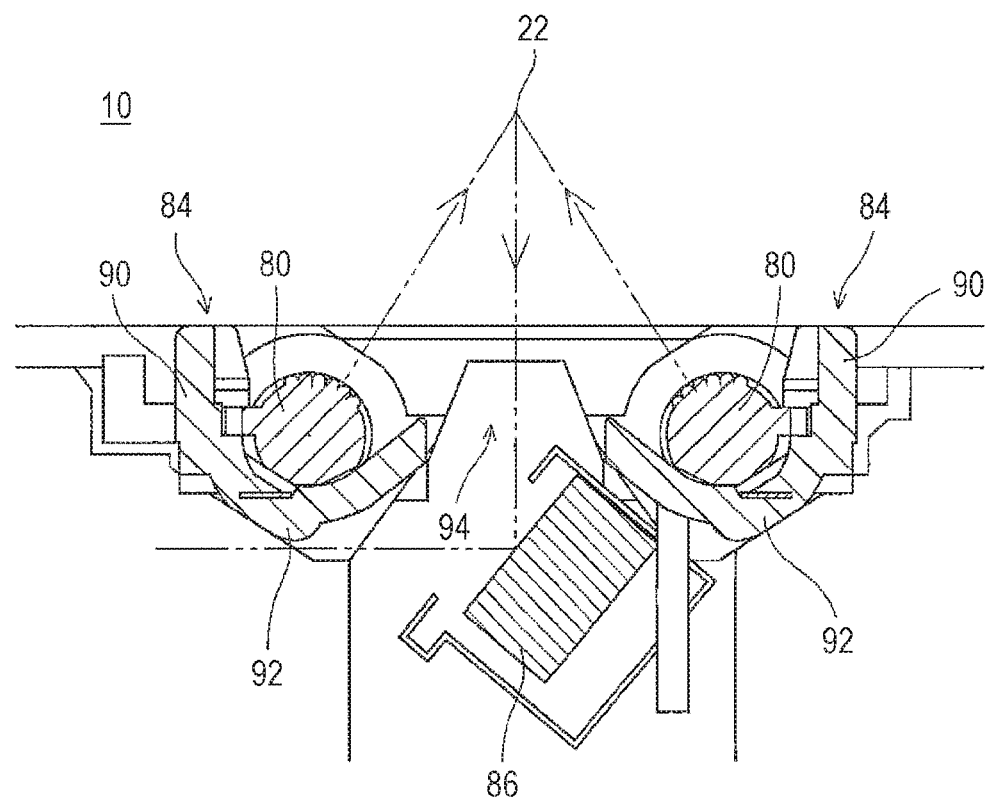
FIG. 3 is a schematic sectional view of the illumination device of FIG. 1.
Figure 4:
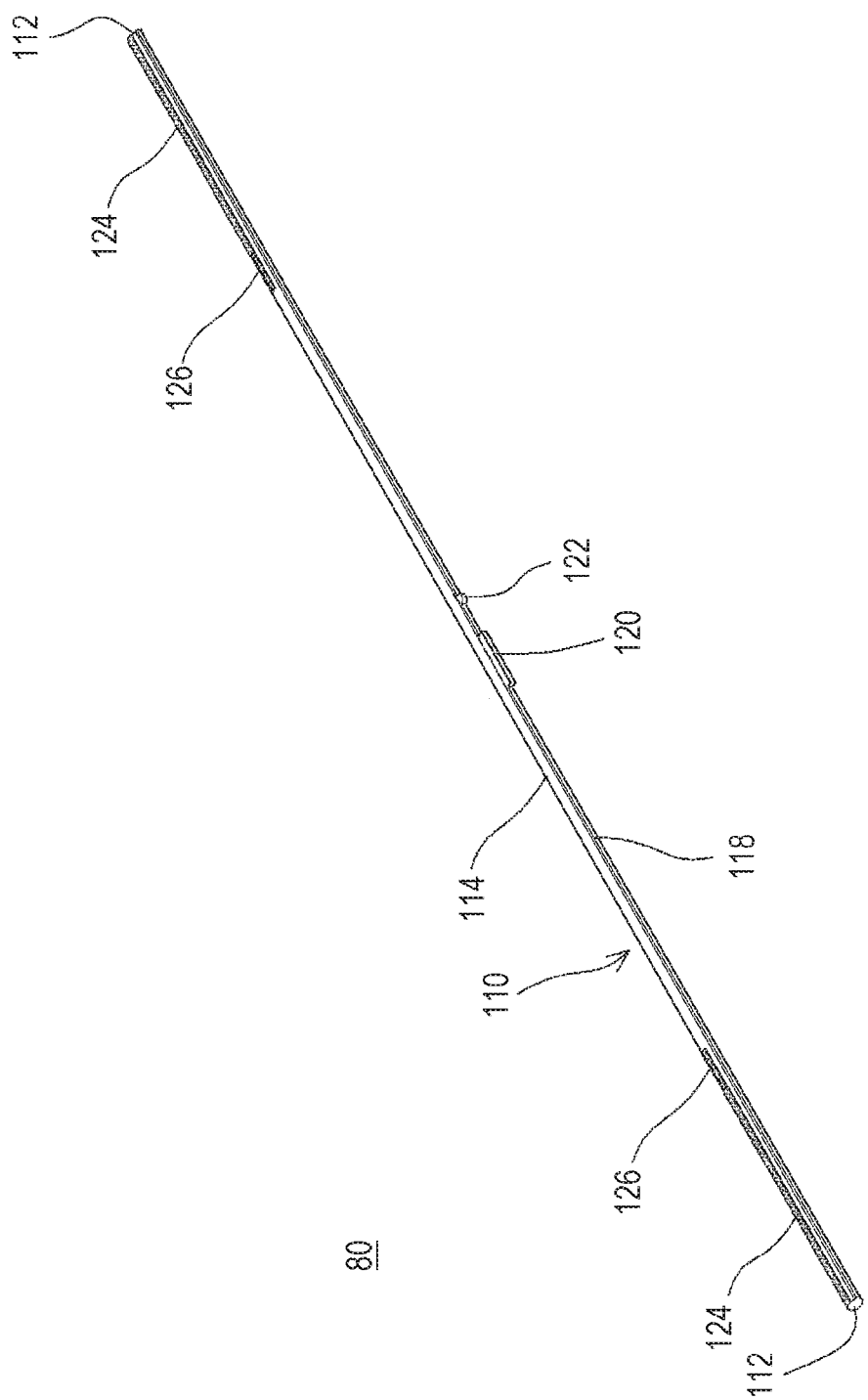
FIG. 4 is a perspective view of a light guide member that is included in the illumination device of FIG. 3.
Figure 5:
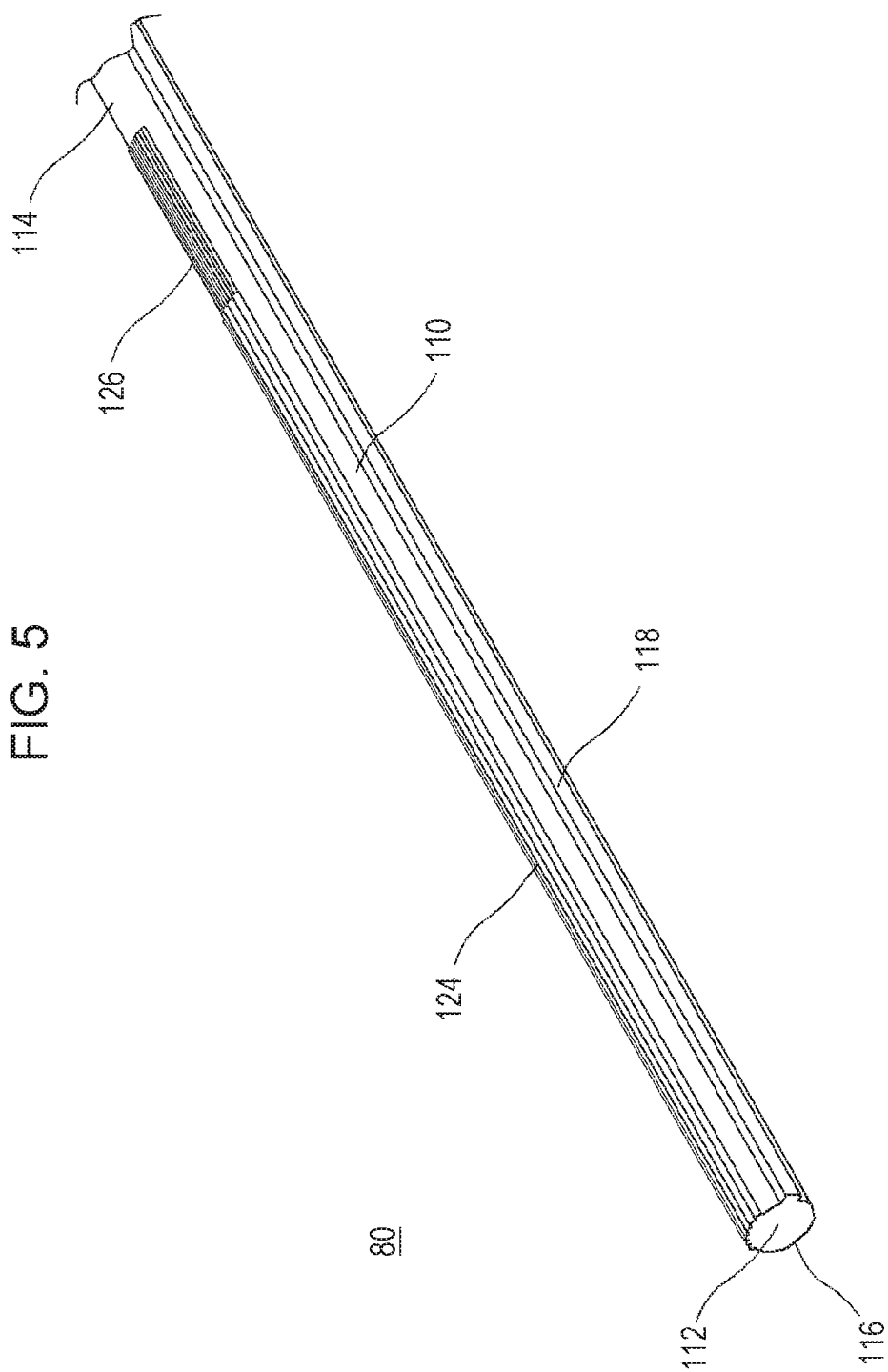
FIG. 5 is a partial enlarged perspective view of an end portion of the light guide member of FIG. 4.
Figure 6:
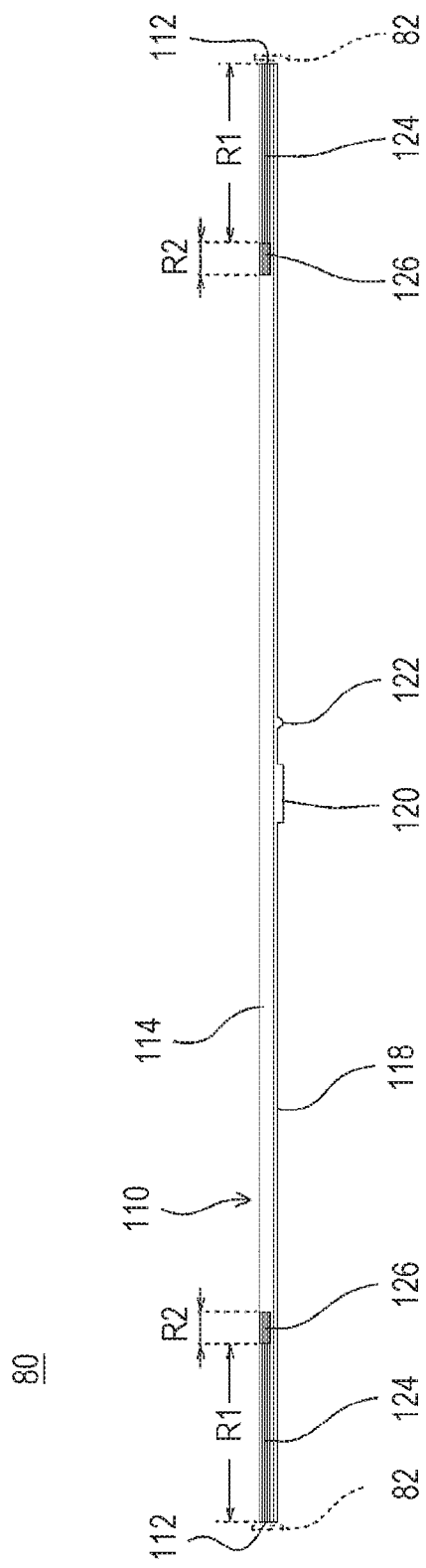
FIG. 6 is a plan view of the light guide member of FIG. 4.
Figure 7:
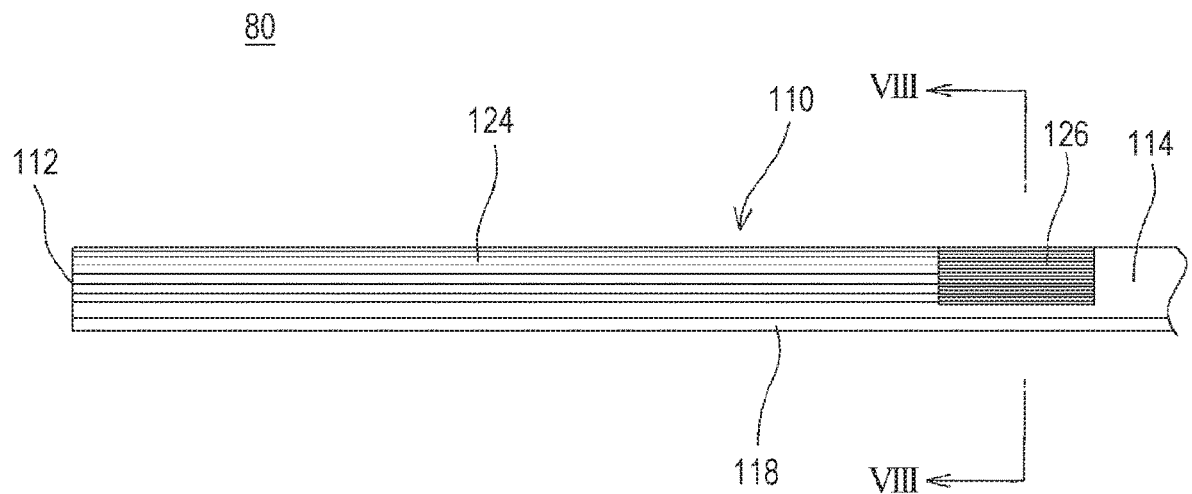
FIG. 7 is a partial enlarged plan view of an end portion of the light guide member of FIG. 6.
Figure 8:
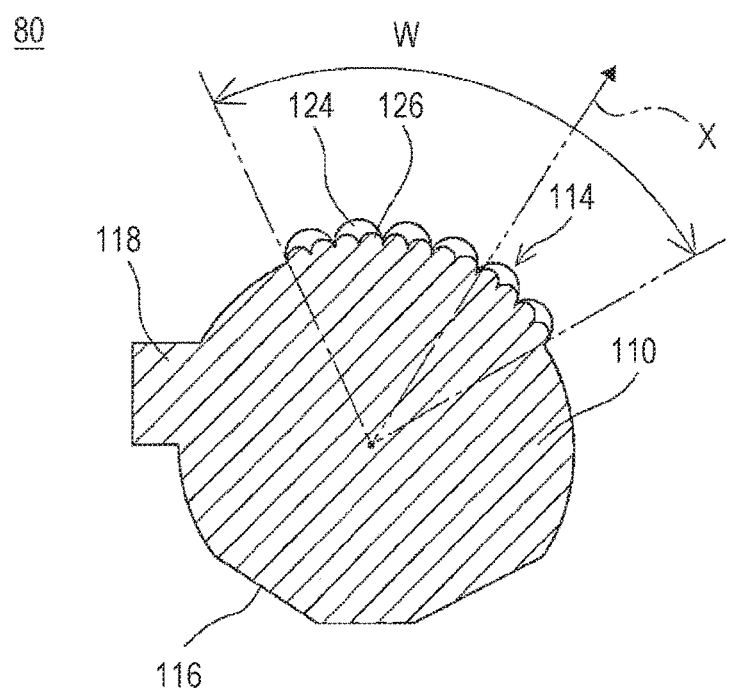
FIG. 8 is a sectional view of the light guide member taken along line VIII-VIII of FIG. 7.

Next, referring to FIG. 3, the structure of the illumination device 10 will be described. In the first embodiment, the illumination device 10 includes two light guide members 80 and two pairs of light sources 82 (see FIG. 6). Each of the light sources 82 faces an end surface of a corresponding one of the light guide members 80. The illumination device 10 may have only one light guide member 80 or three or more light guide members 80. The light source 82 may be disposed near only one end surface of the light guide member 80.

To be specific, the illumination device 10 includes the light guide members 80, the light sources 82, a holder member 84, a first mirror 86, and the like. Although not illustrated, the illumination device 10 may further include, as necessary, a light source drive circuit for driving and controlling the light sources 82, a metal heatsink for radiating heat generated by the light sources 82 to the outside, and the like.

Each of the light guide members 80 is an elongated bar-shaped member made of a transparent material, such as an acrylic resin. The light guide member 80 is made by, for example, injection molding. The light guide member 80 is disposed so as to extend in the main scanning direction. When light from the light source 82 enters the light guide member 80 through an end surface (a light-incident surface 112) thereof, the light guide member 80 guides the light in the longitudinal direction (main scanning direction) and emits the light from the light emission surface 114, which is formed in the circumferential surface thereof in the longitudinal direction. The detailed structure of the light guide member 80 will be described below.

Each of the light sources 82 includes a light emitting element mounted on a surface of a printed circuit board or the like. The light source 82 is disposed so as to face a corresponding one of two end surfaces of the light guide member 80 (see FIG. 6). A light emitting diode (LED) is most suitable as the light source 82, because the size of the device can be reduced and an LED has characteristics as a point light source. However, instead of an LED, another semiconductor device, an electric bulb, or the like may be used. The light source 82 may include an optical system for emitting light toward the end surface of the light guide member 80.

The holder member 84 holds the two light guide members 80 so as to be arranged side by side. The holder member 84 includes wall portions 90 and two placement portions 92. The wall portions 90 each have a substantially rectangular shape that is elongated in the main scanning direction. The placement portions 92 each have a substantially semicylindrical shape, and the light guide members 80 are positioned and fixed to the placement portions 92. A slit 94, through which scanning light reflected from a document passes, is formed between the two placement portions 92. Engaging portions (not shown) are formed in an inner side surface of the wall portion 90 at predetermined positions. The engaging portions respectively engage with a gate 120 and a projection 122 of the light guide member 80 as described below.

The first mirror 86 is a glass mirror having a reflection surface on which a reflection film is formed by vapor deposition of silver. Scanning light reflected by a document is first incident on the first mirror 86. The first mirror 86 is disposed below the slit 94 of the holder member 84 at a predetermined angle so as to guide the scanning light to the mirror unit 70.

Next, referring to FIGS. 4 to 8, the structure of the light guide member 80 will be described. The light guide member 80 is an elongated bar-shaped member made of a transparent material. The light guide member 80 includes a transparent body 110 that is substantially cylindrical. The transparent body 110 has a diameter of, for example, 3 mm, and a length of, for example, 320 mm in the longitudinal direction.

Each of two end surfaces of the transparent body 110 (light guide member 80) is used as the light-incident surface 112, on which light from a corresponding one of the light sources 82 is incident. The light emission surface 114, which has a strip-like shape and extends in the longitudinal direction, is formed in the circumferential surface of the transparent body 110 at a circumferential position facing the image scanning position 22. A light reflection surface 116, which has a strip-like shape and extends in the longitudinal direction, is formed in the circumferential surface of the transparent body 110 at a circumferential position opposite to the light emission surface 114.

The light reflection surface 116 of the light guide member 80 has a planar shape. Although not illustrated, the light reflection surface 116 includes a plurality of recesses (reflection prisms), each of which has a triangular cross-sectional shape, which extend in the transversal direction of the light reflection surface 116, and which are arranged in the longitudinal direction at a predetermined pitch. The pitch of the recesses formed in the light reflection surface 116 gradually decreases toward the center of the light guide member 80 in the longitudinal direction. This is in order to increase the amount of light reflected at a central portion of the light guide member 80 and thereby to enable the light guide member 80 to have a substantially uniform luminance (intensity of illumination light) along the entire length of the light guide member 80 in the longitudinal direction.

A linear protrusion 118 is formed on the circumferential surface of the transparent body 110 at a circumferential position between the light emission surface 114 and the light reflection surface 116. The linear protrusion 118 has a substantially rectangular cross-sectional shape and extends along the entire length of the transparent body 110 in the longitudinal direction. By forming the linear protrusion 118 in the light guide member 80, the mechanical strength of the light guide member 80 is increased. Therefore, bending of the light guide member 80 is suppressed, and the probability that the illuminance becomes nonuniform is reduced.

The gate 120, which has a predetermined width in the longitudinal direction, is formed on a side surface of the linear protrusion 118 (end surface in the protruding direction) at substantially the central position in the longitudinal direction. The projection 122, which has a substantially semicircular cross-sectional shape, is formed on the side surface of the linear protrusion 118 at a position that is offset from the center in the longitudinal direction toward one end portion. Therefore, the light guide member 80 is asymmetrical in the longitudinal direction. The gate 120 and the projection 122 respectively engage with the engaging portions (not shown) of the holder member 84, and thus the position of the light guide member 80 in the illumination device 10 is accurately and easily determined. Moreover, because the light guide member 80 is restrained in the longitudinal direction and in the vertical direction, bending or warping of the light guide member 80 due to vibrations or the like is suppressed, and the probability that the illuminance becomes nonuniform is reduced.

In the illumination device 10, as described above, the recesses formed in the light reflection surface 116 are used to make the illuminance of the light guide member 80 uniform in the longitudinal direction. However, the recesses alone cannot make the illuminance sufficiently uniform. The illuminance of light (intensity of illumination light) emitted from an end portion of the light guide member 80 near the light source 82 is higher than the illuminance of light emitted from a central portion of the light guide member 80 away from the light source 82. In order to make the illuminance of the light guide member 80 in the longitudinal direction more uniform, as in the existing technology described in Patent Document 1, a protruding/recessed portion for diffusing light (light diffusing portion) may be formed in a part of the light emission surface 114 near the light source 82 so as to diffuse light emitted from the part near the light source 82. However, when only the protruding/recessed portion for diffusing light is formed in a part of the light emission surface 114 near the light source 82, stripes (image stripes)

may be generated in a scanned image at a position corresponding to the boundary between the part in which the protruding/recessed portion is formed and a part in which the protruding/recessed portion is not formed.

Therefore, in the first embodiment, at each of two end portions of the light guide member 80 near the light source 82, a first light diffusing portion 124, which has a protruding/recessed shape, is formed in the light emission surface 114; and a second light diffusing portion 126, which has a protruding/recessed shape and has lower light diffusivity than the first light diffusing portion 124, is formed adjacent to the first light diffusing portion 124. Thus, generation of image stripes is suppressed without reducing illuminance on a document. The details will be described below.

The light emission surface 114 includes a first portion that is near the light source 82 and in which the first light diffusing portion 124 is formed and a second portion that is adjacent to an end of the first light diffusing portion 124 away from the light source 82 (that is, near the center of the light guide member 80 in the longitudinal direction) and in which the second light diffusing portion 126 is formed. The light emission surface 114 includes a central portion in the longitudinal direction (that is, a portion further away from the light source 82) that has a smoothly curved surface and does not have a protruding/recessed shape.

In the first embodiment, the first light diffusing portion 124 includes a plurality of protrusions (first protrusions) each having an arc-shaped (semicylindrical) cross section. The first protrusions extend in the longitudinal direction of the light guide member 80 and are arranged in the circumferential direction of the light guide member 80. Likewise, the second light diffusing portion 126 includes a plurality of protrusions (second protrusions) each having an arc-shaped cross section. The second protrusions extend in the longitudinal direction of the light guide member 80 and are arranged in the circumferential direction of the light guide member 80. Note that the cross-sectional shapes of the first protrusions and the second protrusions may be modified as appropriate. The first protrusions and the second protrusions may be formed so that the surfaces of the first light diffusing portion 124 and the second light diffusing portion 126 have wave-like shapes or zigzag shapes.

The second light diffusing portion 126 is formed so as to have lower light diffusivity than the first light diffusing portion 124. That is, in the first embodiment, the depth of the protruding/recessed shape of the second light diffusing portion 126 (the protruding height of the second protrusions) is smaller than the depth of the protruding/recessed shape of the first light diffusing portion 124 (the protruding height of the first protrusions). For example, the depth of the protruding/recessed shape of the second light diffusing portion 126 may be about a half (40% to 60%) of the depth of the protruding/recessed shape of the first light diffusing portion 124. The pitch of the protruding/recessed shape of the second light diffusing portion 126 (the distance between the peaks of adjacent second protrusions) is smaller than the pitch of the protruding/recessed shape of the first light diffusing portion 124 (the distance between the peaks of adjacent first protrusions). For example, the pitch of the protruding/recessed shape of the second light diffusing portion 126 may be about a half (40% to 60%) of the pitch of the protruding/recessed shape of the first light diffusing portion 124.

Moreover, the length of the second light diffusing portion 126 in the longitudinal direction of the light guide member 80 is smaller than that of the first light diffusing portion 124. The length R2 of the second light diffusing portion 126 may be 10% to 40% of the length R1 of the first light diffusing portion 124. In the first embodiment, the length R1 of the first light diffusing portion 124 is, for example, 55 mm, and the length R2 of the second light diffusing portion 126 is, for example, 10 mm. The second light diffusing portion 126, which has low light diffusivity and has a small area as described above, has only a small effect on the total illuminance of the light guide member 80.

The first light diffusing portion 124 and the second light diffusing portion 126 have substantially the same length (width) in the circumferential direction of the light guide member 80. In the first embodiment, the first light diffusing portion 124 and the second light diffusing portion 126 each have a width W that corresponds to a center angle of 85 degrees of the light guide member 80. With respect to the optical axis X, which extends diagonally upward toward the image scanning position 22, the width of a part of the first light diffusing portion 124 and the second light diffusing portion 126 on an upper side (left upper side in FIG. 8) of the optical axis X is greater than the width of a part of the first light diffusing portion 124 and the second light diffusing portion 126 on a lower side (right lower side in FIG. 8) of the optical axis X.

Figure 9:
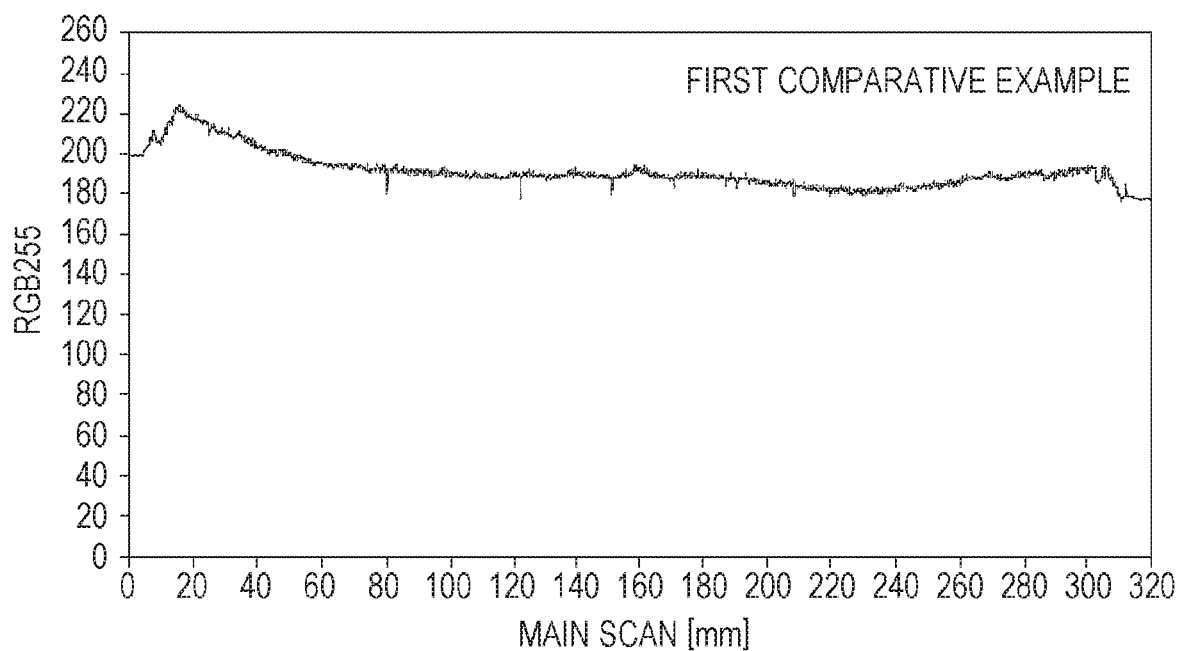
FIG. 9 is a graph representing the illuminance distribution of a light guide member according to a first comparative example, which does not have a light diffusing portion, in the longitudinal direction.
Figure 10:
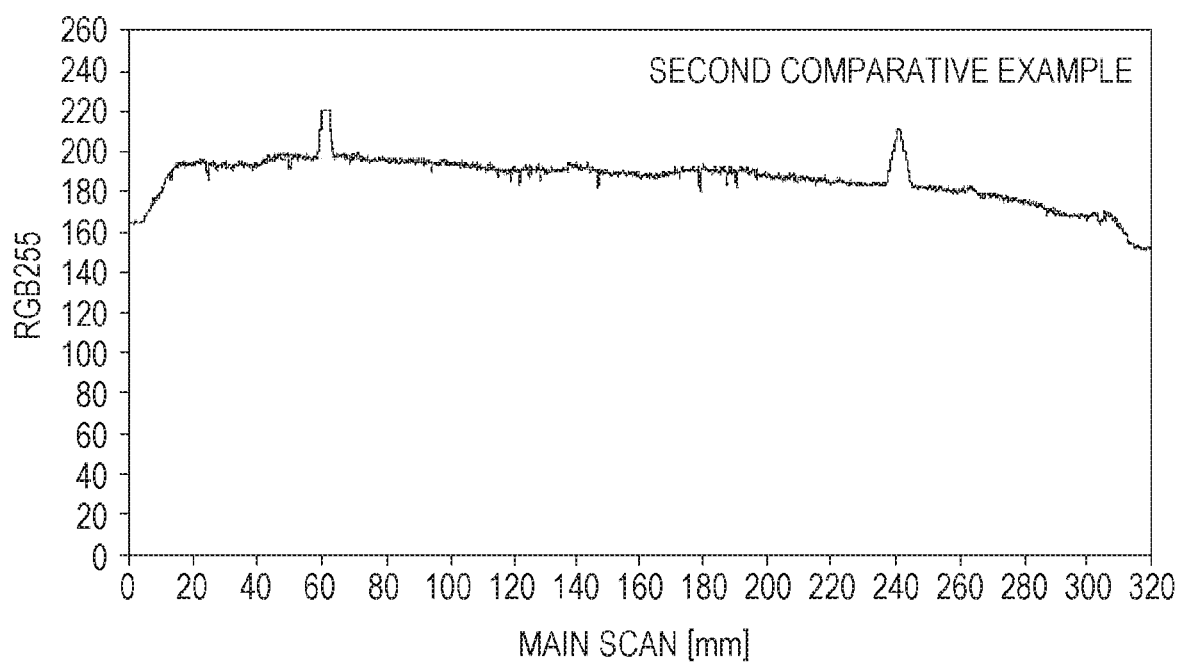
FIG. 10 is a graph representing the illuminance distribution of a light guide member according to a second comparative example, which has only a first light diffusing portion, in the longitudinal direction.
Figure 11:
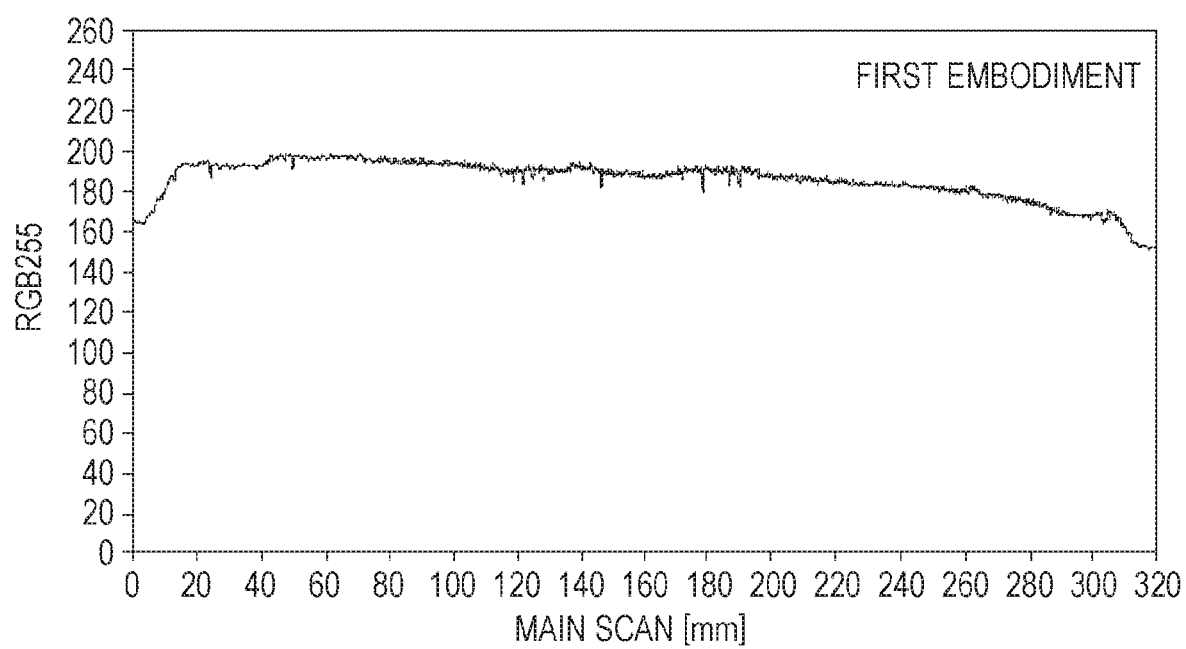
FIG. 11 is a graph representing the illuminance distribution of the light guide member according to the first embodiment of the present disclosure in the longitudinal direction.

FIGS. 9 to 11 are graphs representing the results of simulating the illuminance distributions, in the longitudinal direction, of a light guide member according to a first comparative example, a light guide member according to a second comparative example, and a light guide member according to the first embodiment by using light-ray simulation software. The light guide member according to the first comparative example has the same structure as the light guide member 80 according to the first embodiment except that the first light diffusing portion 124 and the second light diffusing portion 126 are not formed in the light emission surface 114. The light guide member according to the second comparative example has the same structure as the light guide member 80 according to the first embodiment except that only the first light diffusing portion 124 is formed in the light emission surface 114 and the second light diffusing portion 126 is not formed in the light emission surface. In the graphs of FIGS. 9 to 11, the position of an end surface of a light guide member in a front part of the image forming apparatus 100 is 0 mm, and the position of an end surface of the light guide member in a back part of the image forming apparatus 100 is 320 mm.

As illustrated in FIG. 9, the light guide member according to the first comparative example has an illuminance peak in a main scanning range of 0 mm to 55 mm and an illuminance peak in a main scanning range of 260 mm to 320 mm. Accordingly, it is possible to make the illuminance substantially uniform in the longitudinal direction (main scanning direction) by forming the first light diffusing portion 124 in the light emission surface 114 so as to substantially cover these peak positions and by adjusting the illuminance of the first light diffusing portion 124 to the illuminance of a main scanning range of 55 mm to 260 mm.

As illustrated in FIG. 10, the light guide member according to the second comparative example has illuminance peaks, having small widths, near 60 mm and near 240 mm, although the peaks in the main scanning range of 0 mm to 55 mm and in the main scanning range of 260 mm to 320 mm are removed. It is considered that this is an effect of forming the first light diffusing portion 124, and the peak positions substantially coincide with positions where image stripes are generated.

In contrast, as illustrated in FIG. 11, the illuminance of the light guide member 80 according to the first embodiment is substantially uniform along the entire length of the light guide member 80 in the longitudinal direction. The reason for this is considered as follows: illuminance peaks due to the first light diffusing portion 124 are removed by forming the second light diffusing portion 126 adjacent to a central portion of the first light diffusing portion 124; and illuminance peaks due to the second light diffusing portion 126 are not newly generated since the second light diffusing portion 126 has lower light diffusivity than the first light diffusing portion 124. In practice, it was confirmed that generation of image stripes was suppressed by using the light guide member 80 according to the first embodiment.

As described above, with the first embodiment, by forming the first light diffusing portions 124 in the light emission surface 114 and by forming the second light diffusing portions 126, which have lower light diffusivity than the first light diffusing portions 124, adjacent to the first light diffusing portions 124, generation of image stripes can be suppressed. Since the first light diffusing portions 124 and the second light diffusing portions 126 are formed in end portions of the light emission surface 114 in the longitudinal direction, which are near the light sources 82, and a light diffusing portion having a protruding/recessed shape is not formed in a central portion of the light emission surface 114, which is away from the light sources 82, reduction of the total illuminance on a document is suppressed or prevented. Accordingly, with the first embodiment, generation of image stripes is suppressed without reducing illuminance on a document.

With the first embodiment, since each of the second light diffusing portions 126 includes a plurality of protrusions that extend in the longitudinal direction of the light guide member 80, generation of image stripes can be more reliably suppressed even when the illumination device 10 moves in the sub-scanning direction diagonally relative to a document or when a document is fed diagonally.

In the first embodiment, the protrusions of the second light diffusing portion 126 are formed so as to extend in the longitudinal direction of the light guide member 80. However, the protrusions of the second light diffusing portion 126 may be formed so as to extend diagonally relative to the longitudinal direction of the light guide member 80. Also in this case, generation of image stripes can be more reliably suppressed even when a document is fed diagonally.

Second Embodiment

Next, referring to FIG. 12, an illumination device 10 according to a second embodiment of the present disclosure will be described. The second embodiment differs from the first embodiment in the protruding/recessed shape of the second light diffusing portion 126. Since the second embodiment is the same as the first embodiment in other respects, elements of the second embodiment in common with the first embodiment will be denoted by the same numerals and overlapping descriptions will be omitted or simplified.

Figure 12:
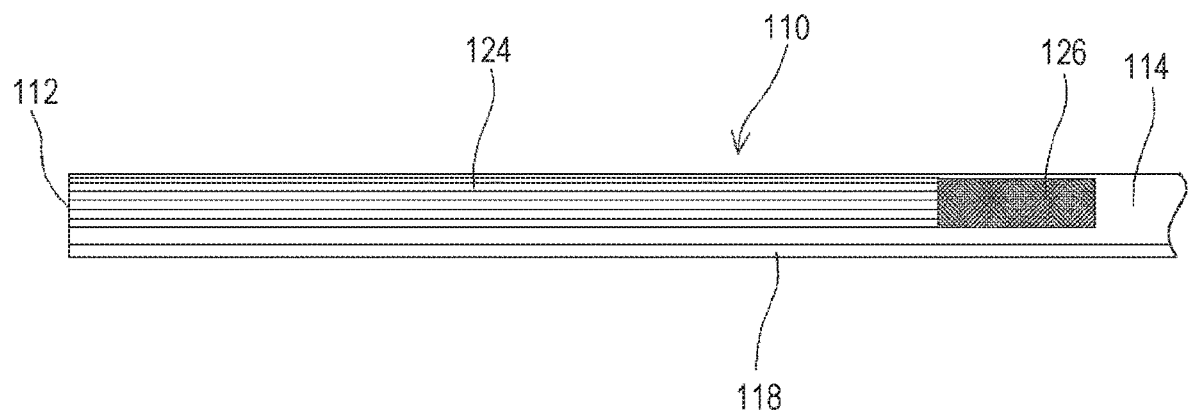
FIG. 12 is a partial enlarged plan view of an end portion of a light guide member according to a second embodiment of the present disclosure.

FIG. 12 illustrates a light guide member 80 of the illumination device 10 according to the second embodiment. The light guide member 80 has a light emission surface 114 including, in an end portion thereof, a first portion that is near the light source 82 and in which a first light diffusing portion 124 is formed and a second portion that is adjacent to an end of the first light diffusing portion 124 away from the light source 82 and in which a second light diffusing portion 126 is formed. In the second embodiment, the second light diffusing portion 126 has a rough surface and has lower light diffusivity than the first light diffusing portion 124.

With the second embodiment, as with the first embodiment, generation of image stripes is suppressed without reducing illuminance on a document.

Third Embodiment

Next, referring to FIG. 13, an illumination device 10 according to a third embodiment of the present disclosure will be described. The third embodiment differs from the first embodiment in the protruding/recessed shape of the second light diffusing portion 126. Since the third embodiment is the same as the first embodiment in other respects, elements of the third embodiment in common with the first embodiment will be denoted by the same numerals and overlapping descriptions will be omitted or simplified.

Figure 13:
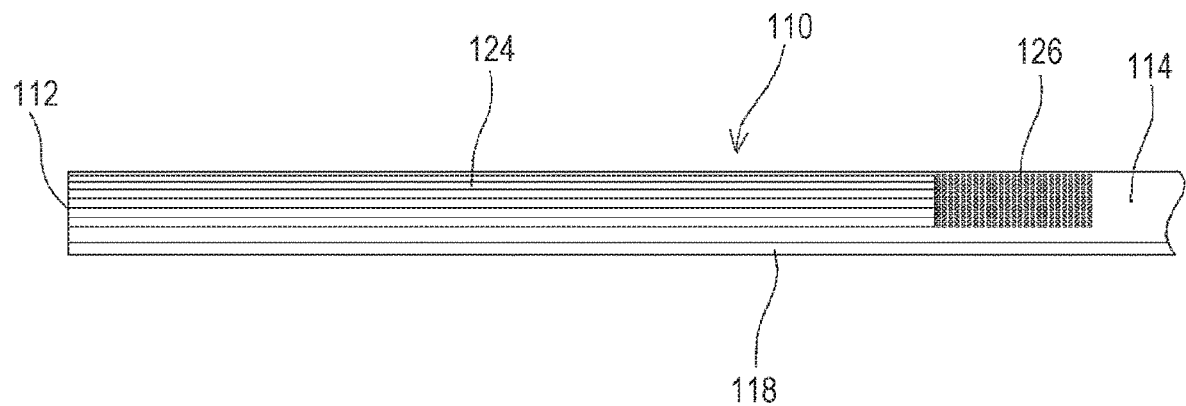
FIG. 13 is a partial enlarged plan view of an end portion of a light guide member according to a third embodiment of the present disclosure.

FIG. 13 illustrates a light guide member 80 of the illumination device 10 according to the third embodiment. The light guide member 80 has a light emission surface 114 including, in an end portion thereof, a first portion that is near the light source 82 and in which a first light diffusing portion 124 is formed and a second portion that is adjacent to an end of the first light diffusing portion 124 away from the light source 82 and in which a second light diffusing portion 126 is formed. In the third embodiment, the second light diffusing portion 126 has dot-shaped protrusions and recesses and has lower light diffusivity than the first light diffusing portion 124. These dots may be regularly arranged or randomly arranged.

With the third embodiment, as in the first embodiment, generation of image stripes is suppressed without reducing illuminance on a document.

In each of the embodiments described above, the first light diffusing portion 124 includes a plurality of protrusions that extend in the longitudinal direction of the light guide member 80. However, this is not a limitation. For example, the first light diffusing portion 124 may have a rough surface or may have dot-shaped protrusions and recesses.

The first light diffusing portion 124 and the second light diffusing portion 126, which are integrally formed with the light emission surface 114 by injection molding, may be formed by postprocessing or by application of a film.

In each of the embodiments described above, the image forming apparatus 100 is, for example, a multifunctional peripheral that is a combination of a copier, a facsimile, a printer, and the like. However, the image forming apparatus 100 may be one of a copier, a facsimile, a printer, and the like, or may be a multifunctional peripheral that is a combination of at least two of these.

Specific numerical values, materials, and shapes described above are only examples and may be changed, as appropriate, in accordance with the specifications of a product and the like.

The present disclosure contains subject matter related to that disclosed in Japanese Priority Patent Application JP 2016-233731 filed in the Japan Patent Office on Dec. 1, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image scanning apparatus comprising:
an illumination device;
a light guide member that is made of a transparent material and that has a bar-like shape; and
a light source that is disposed so as to face at least one end surface of the light guide member,
wherein the illumination device guides light from the light source in the light guide member and emits the light from a light emission surface of the light guide member formed in a longitudinal direction of the light guide member, and
wherein the light emission surface includes, in the longitudinal direction:
a first light diffusing portion, provided at a side of the light source, that diffuses the light, and
a second light diffusing portion, provided between the first light diffusing portion and a central portion in the light guide member, that diffuses the light, and
the first light diffusing portion and the second light diffusing portion differ in shape,
wherein the image scanning apparatus further comprises:
a document table on which a document to be irradiated with light by the illumination device is to be placed, and
an image scanning unit that scans an image of the document,
wherein with respect to an optical axis which extends a diagonally upward toward an image scanning position, a width of a part of each of the first light diffusing portion and the second light diffusing portion on an upper side from the optical axis is set to be greater than a width of a part of each of the first light diffusing portion and the second light diffusing portion on a lower side from the optical axis.

2. The image scanning apparatus according to claim 1, wherein the first light diffusing portion and the second light diffusing portion each have protrusions and recesses.

3. The image scanning apparatus according to claim 2, wherein a depth of the protrusion and the recess of the second light diffusing portion is smaller than a depth of the protrusion and the recess of the first light diffusing portion.

4. The image scanning apparatus according to claim 2, wherein a pitch of the adjacent protrusions of the protrusions of the second light diffusing portion is smaller than a pitch of the adjacent protrusions of the protrusions of the first light diffusing portion.

5. The image scanning apparatus according to claim 1, wherein the second light diffusing portion has lower light diffusivity than the first light diffusion portion.

6. The image scanning apparatus according to claim 1, wherein the second light diffusing portion includes protrusions that extend in the longitudinal direction and that are arranged in a circumferential direction of the light guide member.

7. The image scanning apparatus according to claim 1, wherein the second light diffusing portion has protrusions and recesses, and the protrusions are formed so as to extend diagonally relative to the longitudinal direction of the light guide member.

8. The image scanning apparatus according to claim 1, wherein the light emission surface includes the central portion in the longitudinal direction not having protrusions and recesses.

9. The image scanning apparatus according to claim 1, wherein a length of the second light diffusing portion in the longitudinal direction is smaller than a length of the first light diffusing portion in the longitudinal direction.

10. The image scanning apparatus according to claim 1, wherein the first light diffusing portion and the second light diffusing portion have the same length in a circumferential direction of the light guide member.

11. The image scanning apparatus according to claim 1, wherein the first light diffusing portion and the second light diffusing portion each have a length in a circumferential direction of the light guide member that corresponds to a center angle of more than 0 degrees and less than 90 degrees of the light guide member.

12. An image forming apparatus comprising:
the image scanning apparatus according to claim 1; and
an image forming section that forms an image, scanned by the image scanning apparatus, on a sheet.

* * * * *